United States Patent
Lomakin et al.

(10) Patent No.: US 9,931,751 B2
(45) Date of Patent: Apr. 3, 2018

(54) PROGRAMMING METHOD FOR A PATH TO BE TRAVELED BY AN END EFFECTOR

(71) Applicant: SIEMENS AKTIENGESELLSCHAFT, München (DE)

(72) Inventors: Dimitri Lomakin, Nürnberg (DE); Christof Sinn, Mühlacker (DE); Thilo Stolper, Stuttgart (DE)

(73) Assignee: SIEMENS AKTIENGESELLSCHAFT, München (DE)

(*) Notice: Subject to any disclaimer, the term of this patent is extended or adjusted under 35 U.S.C. 154(b) by 770 days.

(21) Appl. No.: 14/487,839

(22) Filed: Sep. 16, 2014

(65) Prior Publication Data
US 2015/0081085 A1 Mar. 19, 2015

(30) Foreign Application Priority Data
Sep. 17, 2013 (EP) .................................. 13184752

(51) Int. Cl.
*B25J 9/16* (2006.01)

(52) U.S. Cl.
CPC ... *B25J 9/1671* (2013.01); *G05B 2219/40479* (2013.01); *G05B 2219/40519* (2013.01)

(58) Field of Classification Search
CPC ........ B25J 9/162; B25J 9/1602; B25J 9/1664; B25J 9/1687; B25J 9/1671; G05B 2219/40519; G05B 2219/40479
(Continued)

(56) References Cited

U.S. PATENT DOCUMENTS 4,954,762 A  9/1990  Miyake et al.
4,975,856 A * 12/1990  Vold ..................... B25J 9/1602
                                                 318/568.19
(Continued)

FOREIGN PATENT DOCUMENTS

CN   102216037 A   10/2011
CN   102294695 A   12/2011
(Continued)

OTHER PUBLICATIONS

Schwanecke et al., U.S. Pat. No. 7,149,668, Dec. 12, 2006, 2003-0083773 A1, May 1, 2003.
(Continued)

*Primary Examiner* — Timothy R Waggoner
(74) *Attorney, Agent, or Firm* — Henry M. Feiereisen LLC

(57) ABSTRACT

A programming device receives a number of local coordinate systems from a user. Each local coordinate system is referenced directly or via at least one other local coordinate system to a global machine coordinate system of a motion-controlled machine. The programming device receives from the user, in each case with reference to one of the local coordinate systems, a number of positions to be approached by the end effector and/or a number of obstacles to be bypassed by the end effector. The programming device determines, with reference to the positions to be approached received from the user and the obstacles received from the user in the global machine coordinate system, the path to be traveled by the end effector The programming device stores the path to be traveled by the end effector as a first file so that it can be retrieved again at a later time.

23 Claims, 4 Drawing Sheets

(58) Field of Classification Search
USPC .............. 700/251, 253, 255, 194, 192, 245; 318/568.11, 568.13, 568.19
See application file for complete search history.

(56) References Cited

U.S. PATENT DOCUMENTS

| | | | |
|---|---|---|---|
| 6,292,715 B1 * | 9/2001 | Rongo | B25J 9/1664 318/568.1 |
| 2011/0077926 A1 | 3/2011 | Amthor et al. | |
| 2016/0288331 A1 * | 10/2016 | Sivich | B25J 9/1697 |

FOREIGN PATENT DOCUMENTS

| | | |
|---|---|---|
| CN | 102902269 A | 1/2013 |
| CN | 202890093 U | 4/2013 |
| EP | 0271691 A1 | 6/1988 |
| EP | 0381185 A2 | 8/1990 |
| JP | S50112969 A | 9/1975 |
| JP | S5125273 A | 3/1976 |
| WO | WO 8404980 A1 | 12/1984 |

OTHER PUBLICATIONS

Sinn, U.S. Pat. No. 6,879,874, Apr. 12, 2005, 2003-0045965 A1, Mar. 6, 2003.
Kobbelt et al., U.S. Pat. No. 6,901,310, May 31, 2005, 2004-0054433 A1, Mar. 18, 2004.
Sinn, U.S. Pat. No. 6,956,567, Oct. 18, 2005, 2003-0052882 A1, Mar. 20, 2003.
Sinn, U.S. Pat. No. 6,961,056, Nov. 1, 2005, 2003-0128206 A1, Jul. 10, 2003.
Papiernik et al., U.S. Pat. No. 7,062,353, Jun. 13, 2005, 2004-0070585 A1, Apr. 15, 2004.
Gsinn et al., U.S. Pat. No. 7,880,361, Feb. 1, 2011, 2008-0252152 A1, Oct. 16, 2008.

* cited by examiner

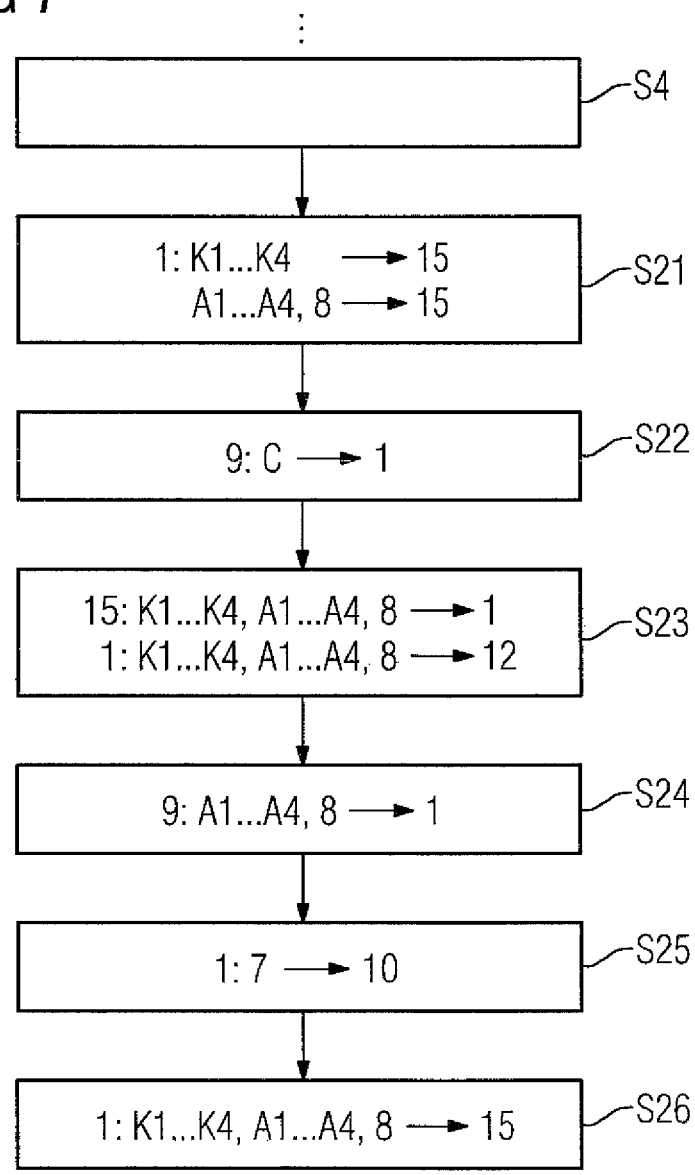

PROGRAMMING METHOD FOR A PATH TO BE TRAVELED BY AN END EFFECTOR

CROSS-REFERENCES TO RELATED APPLICATIONS

This application claims the priority of European Patent Application, Serial No. 13184752, filed Jun. 17, 2013, pursuant to 35 U.S.C. 119(a)-(d), the disclosure of which is incorporated herein by reference in its entirety as if fully set forth herein.

BACKGROUND OF THE INVENTION

The present invention relates to a method for determining a path to be traveled by an end effector of an operating machine. The present invention further relates to a program having machine code that can be executed directly by a programmable machine to determine the path to be traveled by the end effector, a data carrier on which the program is stored in machine-readable form, and a machine programmed to determine the path to be traveled by an end effector.

The following discussion of related art is provided to assist the reader in understanding the advantages of the invention, and is not to be construed as an admission that this related art is prior art to this invention.

When programming position-controlled movements, a programmer must be given the possibility of adapting interpolation points of a path to be traveled by an end effector. The programmer must also have the possibility of adding new interpolation points or removing interpolation points. In the prior art, the specification frequently takes place in a CAD-assisted program. For the correct specification of the interpolation points, a model of the motion-controlled machine to be programmed is implemented in the CAD program. Due to inaccuracies and simplifications of the model compared to reality, in individual cases it may be necessary for the programmer to readjust the interpolation points or insert new interpolation points.

It would therefore be desirable and advantageous to address prior art shortcomings and to facilitate programming of position-controlled movements in a simple way.

SUMMARY OF THE INVENTION

According to one aspect of the present invention, a method for determining a path to be traveled by an end effector of a motion-controlled machine, includes the steps of receiving a number of local coordinate systems; each local coordinate system being referenced to a global machine coordinate system of the motion-controlled machine, receiving a plurality of positions to be approached by the end effector, each position being referenced to one of the local coordinate systems, determining a path to be traveled by the end effector in the global machine coordinate system with reference to the local coordinate system positions received; and storing the path to be traveled by the end effector in the global machine coordinate system in a first file such that it can be retrieved for execution at a later time.

According to another advantageous feature of the present invention, the programming device can store the referencing of the local coordinate systems to the global machine coordinate system and, with reference to the respective local coordinate system, the received positions to be approached by the end effector and obstacles to be bypassed by the end effector received with reference to the respective local coordinate systems in a second file. This makes it possible at any time to restore the original programming configuration with which the user worked.

The second file can be different from the first file or identical to the first file. Which of the two procedures to use depends upon the circumstances of the individual case. In the following, it is assumed that the files are different from one another. However, this is not mandatory.

On the basis of the storage of the second file, it is in particular possible for the programming device to receive a request for the second file from the user, then to retrieve the second file and to offer it to the user for execution and, based on the respective local coordinate system, to receive changes to the positions to be approached by the end effector and obstacles to be bypassed by the end effector received with reference to the respective local coordinate system. The changes can in particular encompass the deletion and/or addition of positions to be approached by the end effector and/or obstacles to be bypassed by the end effector.

According to another advantageous feature of the present invention, the programming device receives a selection of a respective local coordinate system from the user, displays a two-dimensional display of a plane of the selected local coordinate system on a display mechanism and superimposes the positions to be approached by the end effector and obstacles to be bypassed by the end effector received from the user projected into the displayed plane. This embodiment makes the entries made by the user understandable to him in a particularly simple and intuitive way.

The specification of positions to be approached by the end effector and obstacles to be bypassed by the end effector can in principle take place in any way desired. However, it is particularly simple and intuitive if the programming device for receiving positions to be approached by the end effector and obstacles to be bypassed by the end effector receives a direct marking in the plane depicted. However, if the programming device has to receive an offset of positions to be approached by the end effector and obstacles to be bypassed by the end effector from this is preferably performed by a numerical entry.

According to another advantageous feature of the present invention, in addition to positions to be approached by the end effector, the programming device can receive from the user a respective permissible tolerance for a position to be approached or an obstacle to be bypassed. This procedure simplifies the precise determination of the path to be traveled by the end effector.

As a rule, the positions to be approached by the end effector received by the programming device form interpolation points in the path to be traveled by the end effector. In this case, the programming device preferably determines the path to be traveled in the machine coordinate system by interpolation between the interpolation points.

According to another advantageous feature of the present invention, the programming device can determine the path to be traveled by the end effector such that it satisfies a predetermined optimization criterion. The optimization criterion can be determined as required. It can for example consist in the fact that the path to be traveled by the end effector is traveled in a time-optimized or energy-optimized way taking into account drive limitations of position-controlled axes of the motion-controlled machine.

In many cases, the local coordinate systems form a sequence. In this case, it results in a particularly efficient and comfortable programming environment if the programming device selects the preceding and/or the subsequent local coordinate system with reference to the currently selected local coordinate system based on uniform scroll commands for all local coordinate systems in the sequence of local coordinate systems.

According to another advantageous feature of the present invention, the programming device can determine with reference to the path determined a sequence of setpoint value for position-controlled axes of the motion-controlled machine, by means of which the end effector is moved along the path to be traveled. Therefore, the programming device preferably directly determines the control program to be executed by a control device for the motion-controlled machine.

According to another aspect of the present invention, a computer program includes a machine code that can be executed directly by a programming device, wherein the execution of the machine code by the programming device causes the programming device to perform a programming method according to the invention. The computer program can in particular be stored on a data carrier in machine-readable form.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 7 is a flow diagram of a superposition of planes.

DETAILED DESCRIPTION OF PREFERRED EMBODIMENTS

Figure 1:
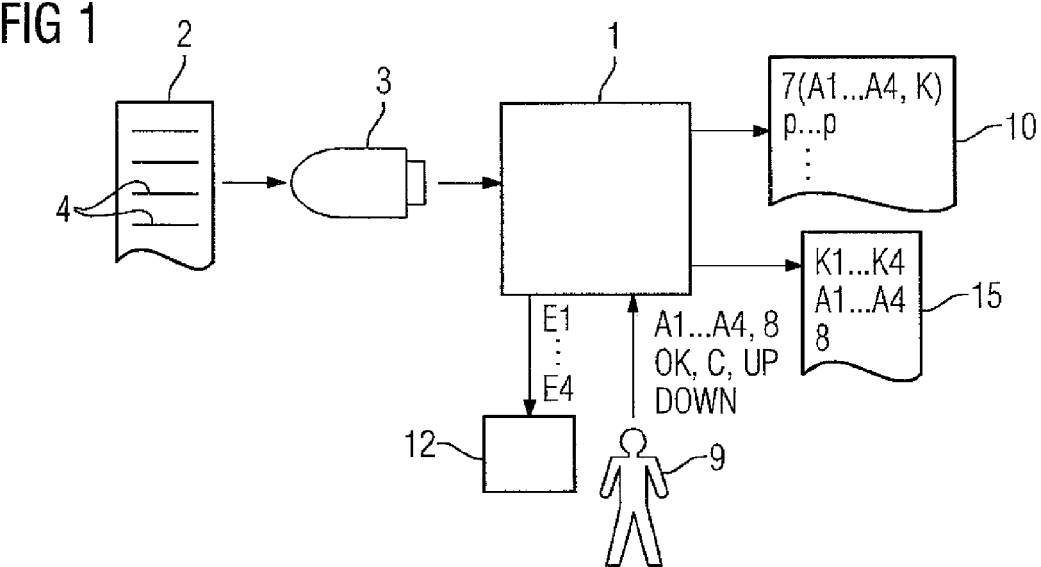
FIG. 1 is a schematic diagram of an end effector programming environment.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a display mechanism 12 and a programming device 1 programmed with a computer program 2. The computer program 2 can be supplied to the programming device 1 via a data carrier 3. In FIG. 1, purely by way of example, a USB memory stick is shown as the data carrier 3. The computer program 2 comprises a machine code 4, which can be directly executed by the programming device 1. The execution of the machine code 4 by the programming device 1 causes the programming device 1 to execute an ascertainment method which will be explained below in conjunction with the other figures.

Figure 2:
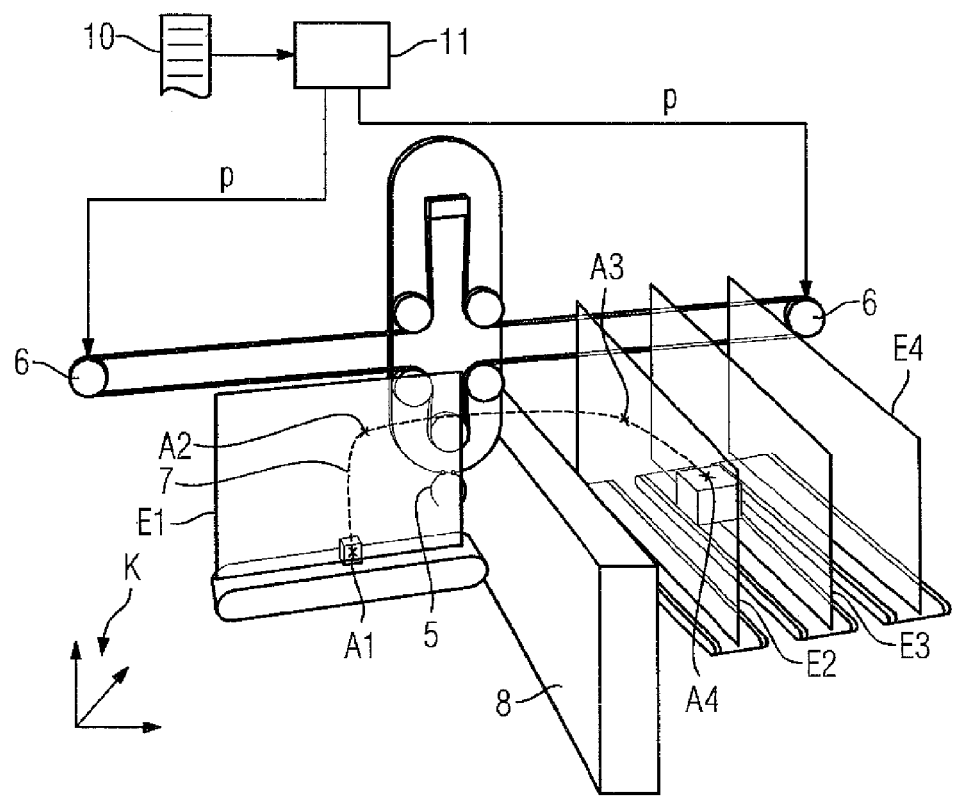
FIG. 2 is a perspective view of a path to be traveled by an end effector.

According to the depiction in FIG. 2, which is purely by way of example, an end effector 5—for example a gripping tool—of a motion-controlled machine is to be moved by means of a number of position-controlled drives 6 along a path 7 to be traveled by the end effector 5 from a starting position A1 to an end position A4. During this, it is will be necessary to bypass an obstacle 8.

In order to be able to specify the path 7 to be traveled to the programming device 1 in a simple way, a user 9 (see FIG. 1) specifies a number of local coordinate systems K1 to K4 to the programming device 1. The programming device 1 receives the local coordinate systems K1 to K4 according to FIG. 3 in a step S1. In FIG. 2, the local coordinate systems K1 to K4 are in each case depicted by a plane E1 to E4. The local coordinate systems K1 to K4 are often rectangular Cartesian coordinate systems. In this case, the respective plane E1 to E4 depicted preferably contains the origin of the respective local coordinate systems K1 to K4 and two axes of the respective local coordinate system K1 to K4. In this case, the third axis of the respective local coordinate system K1 to K4 extends orthogonally to the respective plane E1 to E4.

As part of the specification of the respective local coordinate system K1 to K4, the programming device 1 receives a referencing from the user 9. The referencing can be directly related to a global machine coordinate system K of the motion-controlled machine. In this case, the referencing to the global machine coordinate system K is direct. Alternatively, the referencing can be related to one of the local coordinate systems K1 to K4 already specified by the user 9. In this case, the referencing to the global machine coordinate system K is indirect, namely via at least one other, previously specified local coordinate system K1 to K4. This local coordinate system K1 to K4 is also referenced to the global machine coordinate system K. This referencing can alternatively be direct or indirect. Therefore, multistage, recursive referencing to the global machine coordinate system K is possible.

The user 9 specifies a number of positions A1 to A4 to be traveled by the end effector 5 to the programming device 1, in each case with reference to one of the local coordinate systems K1 to K4. For example, the user 9 can specify the starting position A1 in the plane E1 and the end position A4 in the plane E3. If necessary, the user 9 can also specify intermediate positions A2, A3, which the end effector 5 is to approach on its route from the starting position A1 to the end position A4. For example, the user 9 can specify a first intermediate position A2 in the plane E1 and a second intermediate position A3 in the plane E2. The user 9 also specifies the position of the obstacle 8 to the programming device 1. The programming device 1 receives the corresponding specifications of the user 9 in a step S2.

In a step S3, the programming device 1 determines with reference to the positions A1 to A4 and obstacles 8 received from the user 9 the path 7 to be traveled by the end effector 5 in the global machine coordinate system K. In a step S4, the programming device 1 stores the path 7 to be traveled, that is a corresponding sequence of coordinates in the global machine coordinate system K, in a first file 10. The storage of the first file 10 enables the first file 10 to be retrieved again later at any time. For example—see FIG. 2—it can be transferred to a machine control 11 by which it is then executed under control of its position-controlled drives 6.

In addition, it is even possible for the programming device 1 to determine a sequence of setpoint values p for the position-controlled axes 6 of the motion-controlled machine with reference to the path 7 determined. The determination is performed such that the end effector 5 is moved along the path 7 to be traveled by means of the sequence of setpoint values p. The sequence of setpoint values p can be stored in accordance with the depiction in FIG. 2 in the first file 10 or also in another file not shown in the figure.

Figure 3:
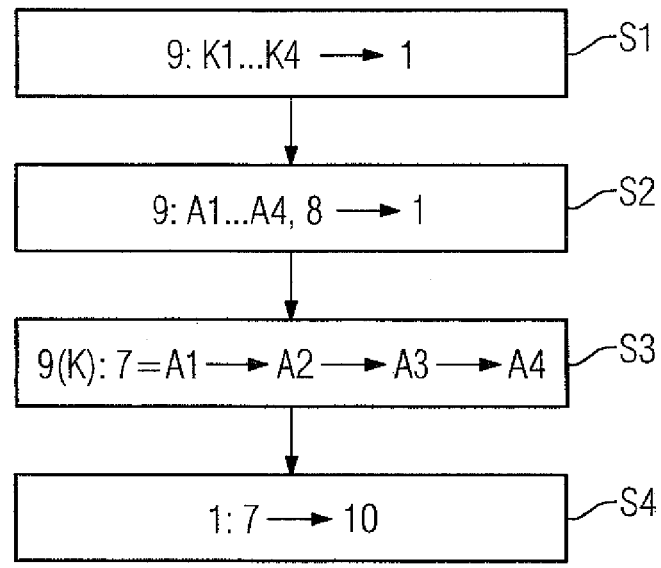
FIG. 3 is a flow diagram of a determination of the path to be traveled by the end effector 5 in the global machine coordinate system.

According to the above explanations in conjunction with FIG. 3, the specification of the local coordinate system K1 to K4 is performed first and only after this, the specification of the positions A1 to A4 to be approached and the obstacles 8 to be bypassed. It is, however, also possible to have a mixed procedure, with which it is possible to specify positions A1 to A4 to be approached and obstacles 8 to be bypassed at any time with respect to each already defined and preferably also already referenced local coordinate system K1 to K4.

Figure 4:
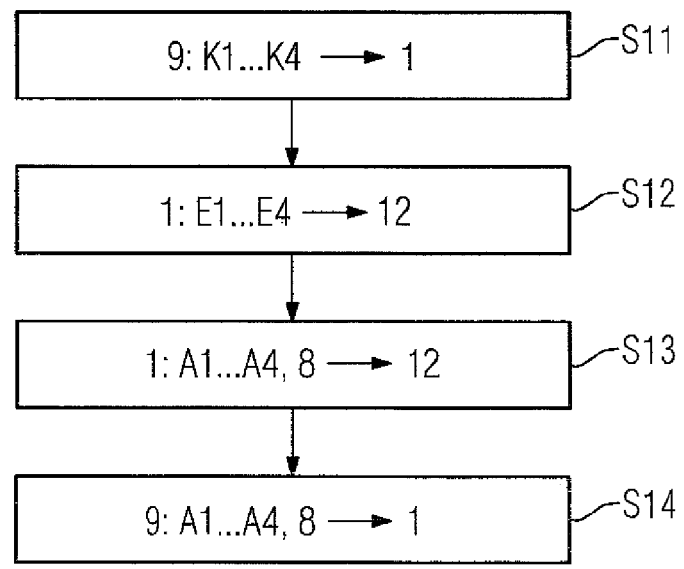
FIG. 4 is a flow diagram of a determination of positions.
Figure 5:
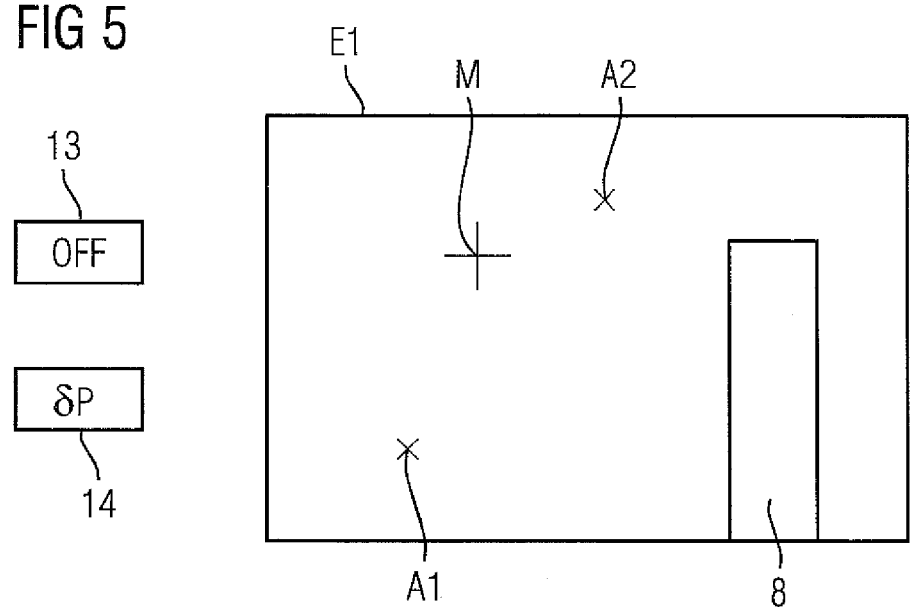
FIG. 5 is a schematic diagram of a display on the display mechanism of FIG. 1.

According to the depiction in FIG. 4, for the specification of positions A1 to A4 and obstacles 8, in a step S11, the programming device 1 preferably initially receives a selection of the respective local coordinate system K1 to K4. In a step S12, the programming device 1 then depicts a two-dimensional display of a plane—in particular the respective plane E1 to E4 of the selected local coordinate system K1 to K4—on a display mechanism 12 (see FIG. 1). FIG. 5 shows—purely by way of example—the plane E1. In the plane E1 to E4 shown, in a step S13, the programming device 1 superimposes the positions A1 to A4 and obstacles 8 received from the user 9. If the positions A1 to A4 and obstacles 8 are not a component of the plane depicted E1 to E4 as such, the programming device 1 receives a projection in the plane E1 to E4 depicted. Preferably, during these superimpositions, only the positions A1 to A4, which were specified by the user 9 with respect to the local coordinate system K1 to K4 of the depicted plane E1 to E4 are superimposed. Therefore, if, as shown in the depiction in FIG. 5 for example, the plane E1 is depicted, only the starting position A1, the intermediate position A2 and the obstacle 8 are superimposed since only these were specified with respect to the local coordinate system K1 of the plane E1.

In a step S14—optionally performed repeatedly—the programming device 1, according to one possible implementation of step S2, then receives the positions A1 to A4 and obstacles 8 of the corresponding local coordinate system K1 to K4. Here, it is in particular possible in accordance with the depiction in FIG. 5, during the step S14 for receiving positions A1 to A4 and obstacles 8, for the programming device 1 to receive a direct marking M in the plane E1 depicted, for example the positioning of a cursor together with the specification of a confirmation command. If the specified position A1 to A4 or the specified obstacle 8 does not lie directly in the plane E1 depicted, the programming device 1 also receives from the user 9 a corresponding offset OFF. According to FIG. 5, the specification of the offset OFF is performed by specifying a corresponding numerical input to an input field 13.

Preferably, the user 9 of the programming device 1 can also—and to be precise preferably separately for each individual position A1 to A4 to be approached—in addition to the position A1 to A4 to be approached in each case, specify a respective permissible tolerance δP. For example, according to the depiction in FIG. 5, the user 9 can input a corresponding numerical input into a further input field 14. According to FIG. 5, the permissible tolerance OP is also superimposed onto the plane E1 to E4 depicted.

The positions A1 to A4 specified by the user 9 and received by the programming device 1 form interpolation points in the path 7 to be traveled. Therefore, the programming device 1 determines the path 7 to be traveled according to the depiction in FIG. 3 by interpolation between the interpolation points A1 to A4. As indicated in FIG. 3, the path 7 is determined in the machine coordinate system K.

Obviously, the determination of the path 7 to be traveled by the programming device 1 is performed taking into account the specified positions A1 to A4 to be approached and the specified obstacles 8 to be bypassed. The programming device 1 also determines the path 7 to be traveled such that it satisfies an optimization criterion OK. Alternatively, the optimization criterion OK can be specified as default to the programming device 1 or specified to the programming device 1 by the user 9. It can, for example, consist in the fact that the path 7 to be traveled is traveled taking into account drive limitations of the position-controlled axes 6 of the motion-controlled machine in a time- or energy-optimized way. Procedures of this kind are generally known to people skilled in the art. The drive limitations of the position-controlled axes 6 can, for example, be maximum permissible positive and negative speeds, maximal permissible positive and negative accelerations and maximal permissible positive and negative jerks. In some circumstances, traveling limitations are also possible.

Figure 6:
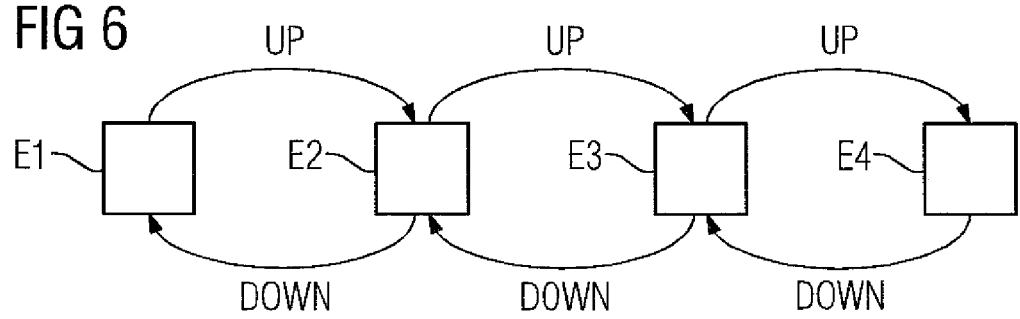
FIG. 6 is a schematic diagram of planes assigned to local coordinate systems.

The local coordinate systems K1 to K4 can—be it inevitable, be it due to the sequence of its definition or be it, for example, due to an arbitrary definition by the user 9—form a sequence. For example, according to the depiction in FIG. 6—based on the planes E1 to E4 assigned to the local coordinate systems K1 to K4—the sequence E1-E2-E3-E4 can ensue. Regardless of whether the local coordinate systems K1 to K4 form a sequence or not, they can always be selected directly by the user 9. However, if the local coordinate systems K1 to K4 form a sequence, it is also possible to use indirect selection in the form of scrolling to select a local coordinate system K1 to K4. In this case, the user 9—see FIG. 6—can, for example, specify a scroll command UP to scroll forward or alternatively a scroll command DOWN to scroll backward. If the user 9 specifies the scroll command UP to scroll forward, the programming device 1 selects the immediately subsequent local coordinate system K1 to K4 depending upon the local coordinate system K1 to K4selected at the time of the specification of the scroll command UP. If the user 9 specifies the scroll command DOWN to scroll backward, the programming device 1 selects the immediately preceding local coordinate system K1 to K4 depending upon the local coordinate system K1 to K4 selected at the time of the specification of the scroll command DOWN.

According to FIG. 7—see also FIG. 1—preferably, in a step S21, the programming device 1 stores in a second file 15, the local coordinate system K1 to K4 including its referencing (and hence as a result, the referencing to the global machine coordinate system K) and with reference to the respective local coordinate system K1 to K4, the positions A1 to A4 and obstacles 8 received with respect to the respective local coordinate system K1 to K4.

The storage can, optionally, take place on the basis of an inherent storage command. However, independently of this, due to the storage in the second file 15, it is possible for the user 9 of the programming device 1 to specify a call command C which the programming device 1 receives in a step S22. The call command C causes the programming device 1 to retrieve the second file 15 in a step S23 and offer it to the user 9 in the usual way for execution. In particular, the user 9 is given the ability to specify changes to the programming device 1 in a step S24 that is, optionally, repeatedly executed. The changes can be changes to already defined positions A1 to A4 to be approached or changes to already defined obstacles 8 with respect to the respective local coordinate system K1 to K4. Alternatively, they can be changes to the referencing to existing local coordinate systems K1 to K4. As a further alternative, it is possible to delete or add positions A1 to A4 to be approached and obstacles 8 in existing local coordinate systems K1 to K4. As a further alternative, new local coordinate systems can be defined and referenced directly or indirectly to the global machine coordinate system K and positions to be approached and obstacles to be bypassed can be specified in respect of the new local coordinate systems. Obviously, in this case, it is also possible in steps S25 and S26 to store a correspondingly modified first file 10 and a correspondingly modified second file 15.

To summarize, therefore, the present invention relates to the following subject matter:

A programming device 1 receives from a user 9 a number of local coordinate systems K1 to K4. Each local coordinate system K1 to K4 is referenced directly or via at least one other local coordinate system K1 to K4 to a global machine coordinate system K of a motion-controlled machine. The programming device 1 receives from the user 9, in each case with reference to one of the local coordinate systems K1 to K4, a number of positions A1 to A4 to be approached by the end effector 5 and a number of obstacles 8 to be bypassed by the end effector 5. The programming device 1 determines, with reference to the positions to be approached A1 to A4 that were received from the user 9 and the obstacles 8 that were received from the user 9, the path 7 to be traveled by the end effector 5 in the global machine coordinate system K. The programming device 1 stores the path 7 to be traveled by the end effector 5 as a first file 10 so that it may be retrieved again at a later time.

The present invention has numerous advantages. In particular, it is possible in a simple, flexible and reliable way to specify the relevant information (positions A1 to A4 to be approached and obstacles 8 to be bypassed) to the programming device 1 and, if necessary, adapt this information.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein.

What is claimed is:

1. A programming method for determining a path for an end effector of a programmable motion-controlled machine, comprising the steps of:
    receiving multiple local coordinate systems; each local coordinate system being referenced to a global machine coordinate system of the motion-controlled machine;
    receiving a plurality of positions to be approached by the end effector, each position being referenced to one of the local coordinate systems;
    determining a path to be traveled by the end effector in the global machine coordinate system with reference to the local coordinate system positions received; and
    storing the path to be traveled by the end effector in the global machine coordinate system in a first file such that it can be retrieved for execution at a later time.

2. The programming method of claim 1 wherein a position to be approached by the end effector is an obstacle to be bypassed by the end effector.

3. The programming method of claim 1 wherein a local coordinate system is referenced to the global machine coordinate system via at least one other local coordinate system.

4. The programming method of claim 1 wherein the received plurality of positions to be approached by the end effector in respective local coordinate systems further includes the position of at least one obstacle to be bypassed by the end effector in a respective local coordinate system.

5. The programming method of claim 4, further comprising the steps of: calling up the second file; and modifying the local coordinate system positions stored in the second file by adding a local coordinate system position with reference to a local coordinate system to the local coordinate system positions stored in the second file; and storing the modified local coordinate system positions and the referencing of the respective local coordinate systems of the modified local coordinate system positions to the global machine coordinate system in a modified second file.

6. The programming method of claim 5, further comprising the steps of calling up the modified second file; determining a modified path to be traveled by the end effector in the global machine coordinate system with reference to the local coordinate system positions and the referencing of the local coordinate systems to the global coordinate system stored in the modified second file; and storing the path to be traveled by the end effector in the global machine coordinate system in a modified first file such that it can be retrieved for execution at a later time.

7. The programming method of claim 6 wherein the local coordinate systems form a sequence and that, based on a currently selected local coordinate system, the programming device selects the local coordinate system preceding or subsequent to the currently selected local coordinate system on the basis of scroll commands.

8. The programming method of claim 1 further comprising the step of storing the referencing of the local coordinate systems to the global machine coordinate system and the received local coordinate system positions in a second file.

9. The programming method of claim 8, further comprising the steps of: calling up the second file; and changing a stored local coordinate system position with reference to the respective local coordinate system.

10. The programming method of claim 9 wherein changing a stored respective local coordinate system position deletes the stored local coordinate system position.

11. The programming method of claim 1, further comprising the steps of selecting one of the local coordinate systems; depicting the selected local coordinate system as a two-dimensional plane on a display mechanism; and depicting projections of the positions to be approached by the end effector on the depicted plane.

12. The programming method of claim 11, further comprising the step of receiving a direct marking in the depicted plane.

13. The programming method of claim 12, further comprising the step of receiving an offset from the depicted plane of a position to be approached by the end effector as a numerical input.

14. The programming method of claim 11, further comprising the step of superimposing an image of an obstacle to be bypassed by the end effector projected onto the depicted plane.

15. The programming method of claim 14, wherein the optimization criterion is that the path traveled by the end effector is to be energy-optimized, taking into account drive limitations of position-controlled axes in the motion-controlled machine.

16. The programming method of claim 1, further comprising the step of receiving a respective permissible tolerance for a position to be approached by the end effector.

17. The programming method of claim 1 wherein the positions to be approached by the end effector are interpolation points in a path to be traveled by the end effector, said method further comprising the step of determining the path to be traveled in the global machine coordinate system by interpolation between the interpolation points.

18. The programming method of claim 1 wherein the path to be approached by the end effector is determined such that it satisfies a predetermined optimization criterion.

19. The programming method of claim 18, wherein the optimization criterion is that the path traveled by the end effector is to be time-optimized, taking into account drive limitations of position-controlled axes in the motion-controlled machine.

20. The programming method of claim 1, further comprising the step of determining a sequence of setpoint values for position-controlled axes of the motion-controlled machine with reference to the determined path so that the end effector is moved along the path to be traveled.

21. A programmable device programmed to determine the path to be traveled by an end effector of a motion-controlled machine, comprising:
an input adapted for receiving a number of local coordinate systems; each local coordinate system being referenced to a global machine coordinate system of the motion-controlled machine,
an input adapted for receiving a plurality of positions to be approached by the end effector, each position being referenced to one of the local coordinate systems
a computer adapted for determining a path to be traveled by the end effector in the global machine coordinate system with reference to the plurality of local coordinate system positions received; and
an output adapted for storing the path to be traveled by the end effector in the global machine coordinate system in a first file such that it can be retrieved for execution at a later time.

22. The programmable device of claim 20, further comprising an input adapted for selecting one of the local coordinate systems; a display mechanism adapted for depicting the selected local coordinate system as a two-dimensional plane and depicting projections of the positions to be approached by the end effector on the depicted plane.

23. A computer program that is stored in a machine-readable medium in machine-readable code that is executable by a programmable device, comprising:
a routine that receives a number of local coordinate systems; each local coordinate system being referenced to a global machine coordinate system of a motion-controlled machine,
a routine that receives a plurality of positions to be approached by an end effector of the motion-controlled machine, each position being referenced to one of the local coordinate systems
a routine that determines a path to be traveled by the end effector in the global machine coordinate system with reference to the local coordinate system positions received and the received referencing of the local coordinate systems to the global machine coordinate system; and
a routine that stores the determined path that is to be traveled by the end effector in the global machine coordinate system in a first file such that it can be retrieved for execution at a later time.

* * * * *